United States Patent Office 3,385,521
Patented May 28, 1968

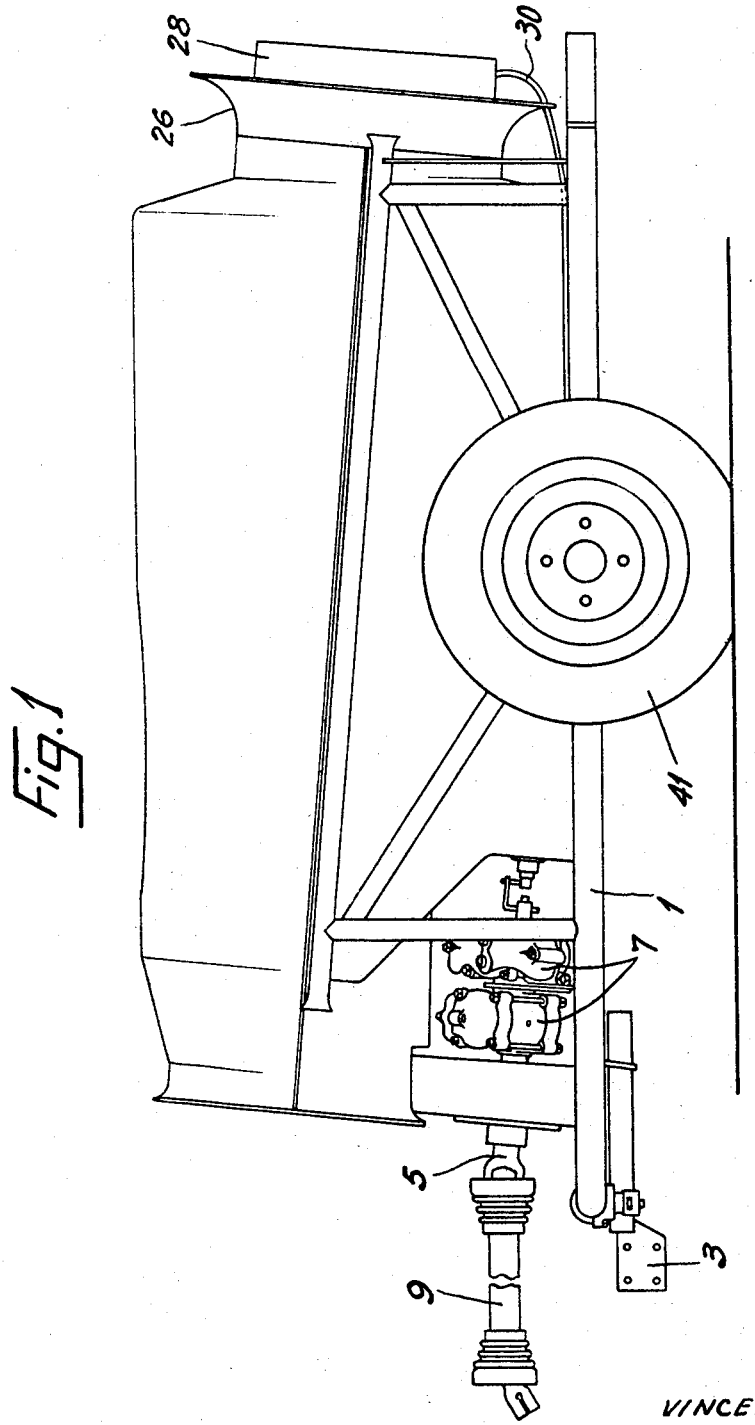

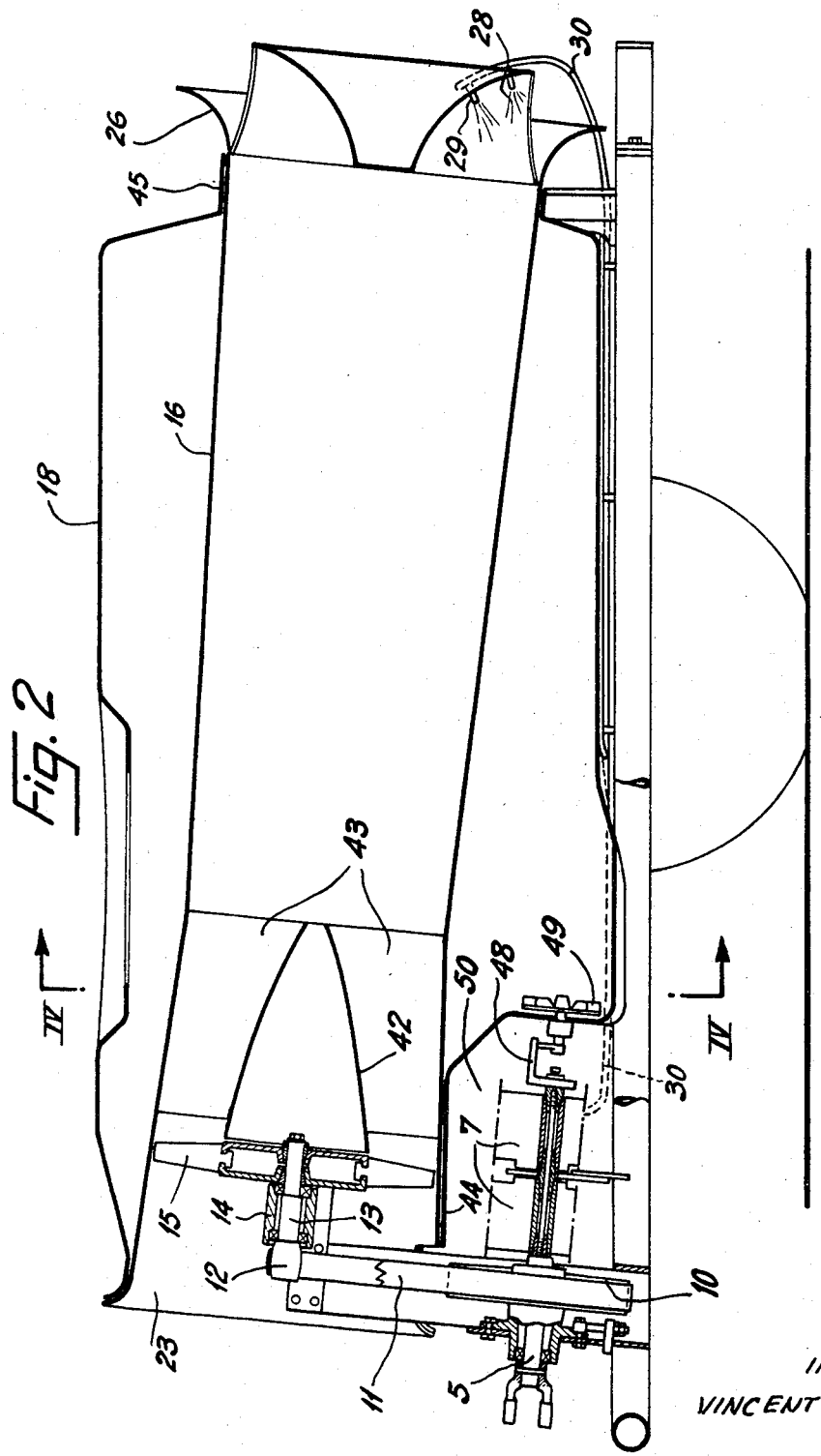

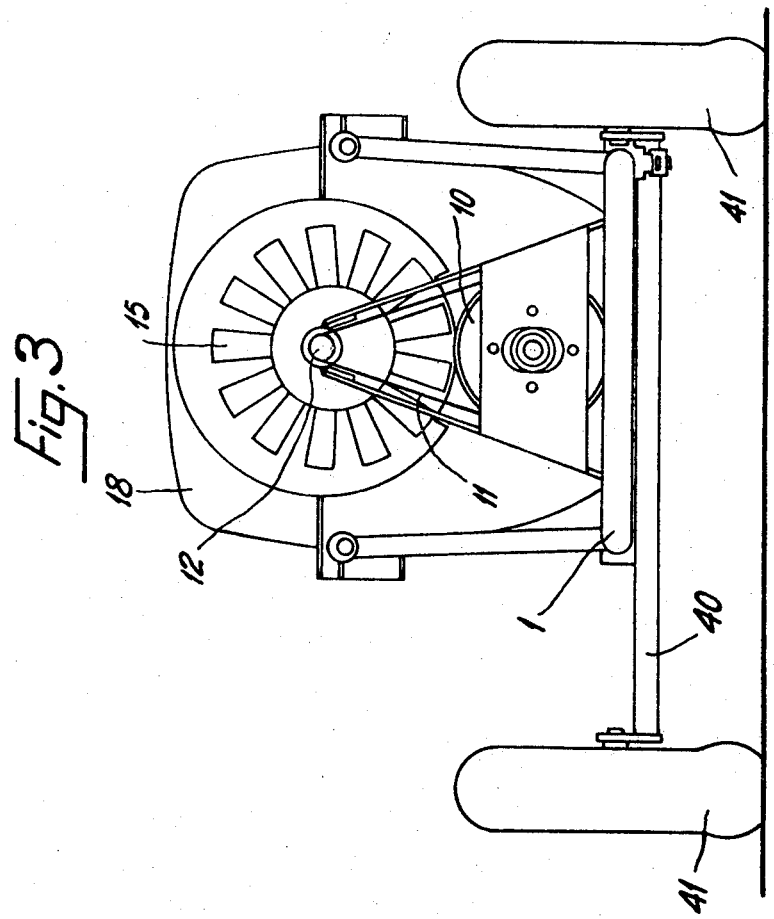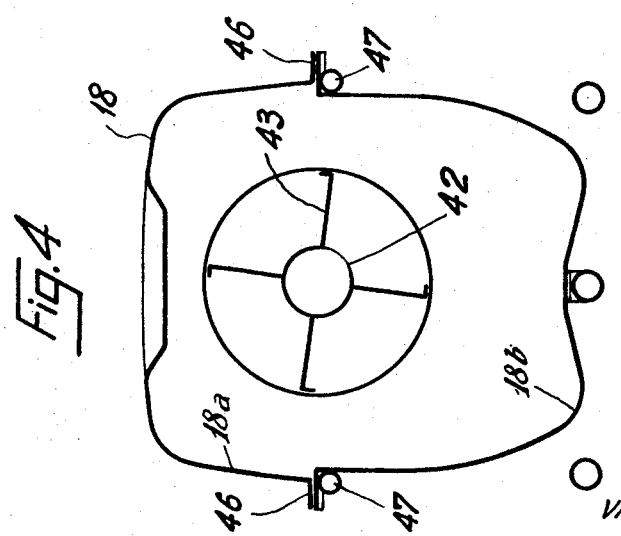

3,385,521
AIR-BLAST SPRAYERS
Vincent P. M. Ballu, Epernay, Marne, France, assignor to Tecnoma (formerly Societe pour la Diffusion de Techniques Nouvelles et de Machinisme Agricole), Epernay, Marne, France
Filed May 2, 1966, Ser. No. 546,687
Claims priority, application France, June 24, 1965, 22,101
1 Claim. (Cl. 239—77)

ABSTRACT OF THE DISCLOSURE

An air-blast sprayer having a rectilinear air duct, blower means near the inlet end and liquid injection means adjacent the outlet end of said duct, which duct is surrounded by a liquid tank of generally annular cross-section, the wall of the air duct constituting the inner wall of the liquid tank. The outer wall of the tank is constituted by upper and lower half-shells sealed to said duct at the ends and to each other along outwardly directed longitudinal flanges, the whole being mounted on a frame by means of the said longitudinal flanges. A liquid pump and a power source for the pump and the air blower are mounted on the frame and located in a recess of the lower half-shell.

Air-blast sprayers or atomisers are known which are intended for such purposes as the treatment of vegetables and which comprise a circular cross-section duct or pipe through which a blower causes a current of air to flow, the said duct terminating in a divergent sleeve within which can be fitted an orientatable diffuser comprising at least one passage into which liquid spraying nozzles open.

The present invention relates to improvements in this type of sprayer for the purpose of, more particularly, providing a relatively powerful apparatus which can, for example, be mounted on wheels and towed by a tractor which supplies the necessary power for the operation of the apparatus.

The sprayer according to the invention is essentially characterised in that the pipe or duct is rectiliner and that it extends through the liquid tank, which surrounds it over the greater part of its length. By this means the sprayer can be given a relatively compact construction and one which is extremely robust.

The following description with reference to the accompanying drawings, given by way of non-limitative example, will illustrate how the invention can be carried into effect. Of the drawings, FIGURE 1 is a side elevational view of a towable sprayer according to the present invention.

FIGURE 2 is a sectional view of the sprayer in FIGURE 1 taken on its median vertical longitudinal plane.

FIGURE 3 is an end view of the sprayer in FIGURES 1 and 2.

FIGURE 4 is a sectional view taken on IV—IV of FIGURE 2.

In the constructional example illustrated in the drawings, frame 1 of the sprayer is mounted in a laterally adjustable manner on an axle 40 provided with wheels 41. A tow coupling 3 is used for attaching the apparatus to a tractor (not shown), the power take-off shaft of the tractor being connected to power input shaft 5 of the sprayer by means of a universal-joint coupling 9 (FIGURES 1 and 3).

As will be seen more particularly from FIGURES 2 and 3, air-blast duct or pipe 16 is of circular cross-section and has a rectilinear axis. It is made in the form of a convergent-divergent nozzle whose entry portion 23 contains a fan blower 15, followed by a profiled core or fairing 42 connected by guide vanes to the wall of the duct. Shaft 13 of the fan is mounted in a bearing 14 carried by a support forming part of the frame 1. The outlet end of the divergent portion of the duct terminates in a sleeve 26 supplemented by a diffuser 28 which forms with the said sleeve a passage into which open spraying nozzles 29. The nozzles are fed from conduits 30 supplied by pumps 7 (FIGURES 1 and 2) which are fixed to the frame 1.

The duct 16 is surrounded over the greater part of its length by the tank 18 which is sealingly connected to it at opposite end zones 44 and 45. The duct thereby forms an internal wall of the tank. The external wall of the tank is formed by two half-shells 18a, 18b connected together at longitudinal flanges 46 which also serve for mounting the tank on supports 47 of the frame (FIGURE 4).

The shaft 5 drives not only the fan 15, by means of a belt transmission 10, 11, 12, but also the pumps 7 and, at the bottom of the tank, an agitator 49 (FIGURE 2) through the agency of a coupling 48.

This mechanism is grouped at the forward end of the machine in a space 50 formed under the entry portion 23 of the duct by recessing the lower wall of the tank 18. Thus it can be particularly compact and robust and is protected more particularly from the sprayed outflow.

The rectilinear form of the duct with suction intake at the end opposite to that at which delivery is effected, ensures an advantageous flow of air which may be improved by the guide vanes 43. These vanes can be produced with the core member 42 as light mouldings from materials such as polyester resins reinforced with glass fibres. If necessary, vanes can also be arranged in the divergent portion of the duct.

The fact that the terminal sleeve 26 is longitudinally spaced from the rear wall of the tank 18 also contributes to increasing the output and spray range of the apparatus by virtue of the improved entrainment of air from the area surrounding the discharge outlet.

It will be apparent that modifications may be made to the form of invention which has just been described, more particularly by substitution of equivalent technical means, without thereby departing from the scope of the present invention.

What I claim is:
1. An air-blast sprayer comprising in combination:
   a generally rectilinear air duct (16), air blower means (15) mounted within siad duct at the vicinity of its inlet end (23) and liquid injection means (28, 29) mounted adjacent the outlet end (26) of said duct;
   a liquid tank (18), having a generally annular cross section, the inner wall of which is constituted by said duct, whereas the outer wall is constituted by upper and lower half-shells (18a, 18b) sealingly connected to said duct along complementary portions (44, 45) of its ends and to each other along outwardly directed flanges (46) provided on each of said shells longi- tudinally with respect to said duct, said lower half-shell being provided with a recess (50) under the inlet part (23) of said duct;

a frame (1) having longitudinally directed supporting members (47) adapted to be located under said outwardly directed flanges when said tank is mounted on said frame;

and pump means (7) for said liquid injection means (28, 29) and drive means (5) for said pump means and for said air blower means, mounted on said frame and located in said recess of said lower shell.

References Cited
UNITED STATES PATENTS

| | | | |
|---|---|---|---|
| 2,673,659 | 3/1954 | Moore | 220—5 X |
| 2,908,994 | 10/1959 | Jedrzykowski | 239—77 |
| 3,216,664 | 11/1965 | Wolford et al. | 239—172 X |
| 3,227,376 | 1/1966 | Rittenhouse | 239—524 X |

M. HENSON WOOD, JR., *Primary Examiner.*

M. MAR, *Assistant Examiner.*